United States Patent
Zapata

(10) Patent No.: US 7,909,368 B2
(45) Date of Patent: Mar. 22, 2011

(54) PIPE COUPLING ASSEMBLY AND METHOD FOR LINED AND UNLINED PIPE

(75) Inventor: Oscar Zapata, Odessa, TX (US)

(73) Assignee: Robroy Industries, Inc., Verona, PA (US)

( * ) Notice: Subject to any disclaimer, the term of this patent is extended or adjusted under 35 U.S.C. 154(b) by 336 days.

(21) Appl. No.: 12/130,231

(22) Filed: May 30, 2008

(65) Prior Publication Data

US 2009/0295146 A1    Dec. 3, 2009

(51) Int. Cl.
*F16L 25/00* (2006.01)
(52) U.S. Cl. ............ 285/383; 285/50; 285/55; 285/333; 285/355
(58) Field of Classification Search .......... 285/48, 285/50, 53–55, 331, 333–334, 355, 383, 285/390
See application file for complete search history.

(56) References Cited

U.S. PATENT DOCUMENTS

| | | | | |
|---|---|---|---|---|
| 2,040,766 A * | 5/1936 | Chappell | ............. | 285/55 |
| 2,233,734 A * | 3/1941 | Ely et al. | ............. | 285/55 |
| 2,340,537 A * | 2/1944 | Keener | ............. | 285/55 |
| 3,253,841 A * | 5/1966 | Ahmad | ............. | 285/55 |
| 3,298,716 A * | 1/1967 | Taylor et al. | ............. | 285/55 |
| 3,479,059 A * | 11/1969 | Taylor et al. | ............. | 285/55 |
| 4,619,472 A * | 10/1986 | Kozono et al. | ............. | 285/334 |
| 5,069,485 A * | 12/1991 | Allen et al. | ............. | 285/55 |
| 5,236,231 A * | 8/1993 | Allen et al. | ............. | 285/55 |
| 5,320,388 A * | 6/1994 | Lacy et al. | ............. | 285/55 |
| 6,042,153 A * | 3/2000 | DeLange et al. | ............. | 285/55 |
| 6,312,024 B1 | 11/2001 | Dutilleul et al. | | |
| 6,863,313 B1 * | 3/2005 | DeLange et al. | ............. | 285/55 |
| 7,334,821 B2 * | 2/2008 | Dutilleul et al. | ............. | 285/333 |
| 2005/0173919 A1 | 8/2005 | Posson | | |
| 2005/0246883 A1 | 11/2005 | Alliot et al. | | |
| 2006/0182500 A1 | 8/2006 | Crabtree et al. | | |

FOREIGN PATENT DOCUMENTS

| | | |
|---|---|---|
| EP | 0855546 A1 | 7/1998 |
| KR | 2019860006257 U | 6/1986 |
| KR | 2019940003801 Y1 | 6/1994 |

* cited by examiner

*Primary Examiner* — Aaron Dunwoody
*Assistant Examiner* — Fannie Kee
(74) *Attorney, Agent, or Firm* — The Webb Law Firm

(57) ABSTRACT

A coupling assembly includes a first pipe having a threaded portion and a non-threaded portion and a second pipe having a threaded and non-threaded portion. The non-threaded portion of each of the pipes is located at a free end of the first pipe and the second pipe. The coupling assembly also includes a coupling member for fixedly connecting the first pipe and the second pipe. The coupling member includes a first threaded inlet for receiving the first pipe, a second threaded inlet for receiving the second pipe and a non-threaded portion extending between the first inlet and the second inlet. The non-threaded portion of the coupling member includes an annular recess. A cross-section of the annular recess includes a vertical leg, a first angled leg extending from the vertical leg, a horizontal leg extending from the first angled leg, a second angled leg extending from the horizontal leg and a third angled leg extending from the second angled leg to the first threaded inlet of the coupling member.

13 Claims, 3 Drawing Sheets

PIPE COUPLING ASSEMBLY AND METHOD FOR LINED AND UNLINED PIPE

BACKGROUND OF THE INVENTION

1. Field of the Invention

The present invention relates, in general, to a coupling assembly between two pipes and, more particularly, to a coupling assembly for providing a connection between a lined pipe and an unlined pipe.

2. Description of Related Art

Typical oilfield pipes are produced from steel and corrosion resistant alloys or materials. During production, injection, and disposal well operations, the pipes are exposed to hydrocarbon fluids and gases which contain brine water, hydrogen sulfide, carbon dioxide and other corrosive compounds. The combinations of fluids and gases transmitted by oilfield pipes under extreme temperatures and pressures create a variety of acidic, caustic and corrosive conditions that attack and corrode tubular goods. One solution to prevent corrosion of oilfield steel pipes is to coat the inside of the pipes with a plastic layer or other corrosion resistant coating.

An alternative to prevent corrosion of oilfield pipes is to insert a corrosion resistant liner into the steel pipe. Such liners may be made of polyvinyl chloride (PVC), polyethylene (PE), glass fiber reinforced epoxy resin (GRE), or other reinforced polymer resins. Typically, these liners are up to 45 feet long and have an outside diameter sized to tightly fit within the inside diameter of the steel pipes or to loosely fit creating an annulus, which is subsequently grouted.

In many instances, lined pipes are used in the same pipe line as unlined pipes. The unlined pipes and couplings are usually manufactured from corrosion resistant materials. Accordingly, appropriate threaded coupling assemblies are required to connect the unlined pipe with lined pipe in an end-to-end relationship. Coupling assemblies are also required to connect the internal liner that provides protection for the lined pipe and pipe threaded connection area against internal corrosion and ensures that the internal liner remains secured.

There are a large number of pipe end constructions and thread constructions employed by various pipe manufacturers to assure against fluid and gas leakage. Due to the presence of unique metal-to-metal torque shoulders and metal-to-metal seal areas, many of these pipe ends and thread constructions known in the art require a custom built liner or coupling assembly unique to the pipe end and potentially even a custom pipe end thread design to accommodate an internal lining system.

One method known in the art utilizes an internal lining system that requires the insertion of a somewhat flexible plastic tube inside steel tubing and filling the annular space between the plastic tube and steel tubing with mortar. The inner plastic tube, or liner, is capped or terminated at the end of the pipe with a flange, known as a "flare". The flare ends provide a surface area for compression of a barrier ring, such as an elastomeric barrier ring, in the coupling assembly.

Additionally, lined pipes are often coupled to an unlined box of an accessory such as a valve. Accordingly, a need exists for a pipe coupling that provides a smooth transition between a lined pipe and an unlined pipe or box accessory.

SUMMARY OF THE INVENTION

The coupling assembly of the present invention has been developed to provide a smooth transition between lined pipes and unlined pipes or accessories.

The present invention is directed to a coupling assembly that includes a first pipe having a threaded portion and a non-threaded portion and a second pipe having a threaded and non-threaded portion. The non-threaded portion of each of the pipes is located at a free end of the first pipe and the second pipe. The coupling assembly also includes a coupling member for fixedly connecting the first pipe and the second pipe. The coupling member includes a first threaded inlet for receiving the first pipe, a second threaded inlet for receiving the second pipe and a non-threaded portion extending between the first inlet and the second inlet. In addition, the coupling assembly includes a ring member positioned at the free end of the first pipe. The ring member includes a body member having a first end and a second end. The first end of the body member has a flange extending therefrom. A liner disposed in the first pipe is also provided. The liner has an end configured to cooperate with the first end of the ring member. The coupling assembly also includes a corrosion barrier ring disposed between and cooperating with the second end of the ring member and a beveled portion of the non-threaded portion of the coupling member. The corrosion barrier ring has opposing indented ends comprised of beveled portions configured to cooperate with a beveled portion of the second end of the ring member and the beveled portion of the non-threaded portion of the coupling member. The non-threaded portion of the coupling member includes an annular recess. A cross-section of the coupling member defining the annular recess includes a vertical leg, a first angled leg extending from the vertical leg, a horizontal leg extending from the first angled leg, a second angled leg extending from the horizontal leg and a third angled leg extending from the second angled leg to the first threaded inlet of the coupling member. The first angled leg and the horizontal leg define the beveled portion of the non-threaded portion of the coupling member. The second angled leg and the third angled leg define an undercut recess. The undercut recess is configured to receive the non-threaded portion at the free end of the first pipe.

The cross-section defining the annular recess may further include an additional horizontal leg extending from the vertical leg to a center of the non-threaded portion, a sloping leg extending from the additional horizontal leg, a fourth angled leg extending from the sloping leg and a fifth angled leg extending from the fourth angled leg to the second threaded inlet of the coupling member. The fourth angled leg and the fifth angled leg may be configured to define an additional undercut recess. The additional undercut recess may be configured to receive the non-threaded portion at the free end of the second pipe. The sloping leg may extend from the fourth angled leg to the additional horizontal leg at an angle of about 5°.

The beveled portions of the corrosion barrier ring, the second end of the ring member and the non-threaded portion of the coupling member may be beveled at about a 45° angle. The corrosion barrier ring may be made of a resilient elastomeric material or any other suitable material.

The present invention is also directed to a coupling assembly that includes a pipe comprising a threaded portion and a non-threaded portion and a box accessory comprising a coupling member for fixedly connecting the pipe to the box accessory. The non-threaded portion of the pipe is located at a free end of the pipe. The coupling member includes a threaded inlet for receiving the pipe and a non-threaded portion extending from the threaded inlet. The coupling assembly also includes a ring member positioned at the free end of the pipe and a liner disposed in the pipe. The ring member includes a body member having a first end and a second end. The first end of the ring member has a flange extending therefrom. The liner has an end configured to cooperate with the first end of the ring member. In addition, the coupling assembly includes a corrosion barrier ring disposed between and cooperating with the second end of the ring member and a beveled portion of the non-threaded portion of the coupling member. The corrosion barrier ring includes opposing indented ends comprised of beveled portions configured to cooperate with a beveled portion of the second end of the ring member and the beveled portion of the non-threaded portion of the coupling member. The non-threaded portion of the coupling member includes an annular recess. A cross-section of the coupling member defining the annular recess includes a vertical leg, a first angled leg extending from the vertical leg, a horizontal leg extending from the first angled leg, a second angled leg extending from the horizontal leg; and a third angled leg extending from the second angled leg to the threaded inlet of the coupling member. The first angled leg and the horizontal leg define the beveled portion of the non-threaded portion of the coupling member. The second angled leg and the third angled leg define an undercut recess. The undercut recess is configured to receive the non-threaded portion at the free end of the first pipe.

The box accessory may be a valve or a pump. The beveled portions of the corrosion barrier ring, the second end of the first ring member and the non-threaded portion of the coupling member may be beveled at about a 45° angle. The coupling member may be made of steel. The ring member may be made of glass-reinforced epoxy or any other suitable material. The corrosion barrier ring may be made of a resilient elastomeric material or any other suitable material.

In addition, the present invention is directed to a method for coupling a lined pipe to an unlined pipe. The method includes the steps of providing a first pipe; providing an unlined second pipe; inserting a liner into the first pipe; providing a ring member comprising a body member having a first end with a flange extending therefrom and a second end; placing the ring member in engagement with the first liner; and providing a coupling member adapted to receive a free end of the first pipe and a free end of the second pipe therein. The coupling member includes a first threaded inlet for receiving the first pipe, a second threaded inlet for receiving the second pipe and a non-threaded portion extending between the first inlet and the second inlet. The method also includes the step of interposing a corrosion barrier ring between a beveled portion of the non-threaded portion of the coupling member and the second end of the ring member. The corrosion barrier ring includes opposing indented ends comprised of beveled portions configured to cooperate with a beveled portion of the second end of the ring member and the beveled portion of the non-threaded portion of the coupling member. Additionally, the method includes receiving a free end of the first pipe having the liner disposed therein into the coupling member to fixedly join the first pipe with the coupling member, and receiving a free end of the unlined second pipe into the coupling member to fixedly join the second pipe with the coupling member. The non-threaded portion of the coupling member includes an annular recess. A cross-section of the coupling member defining the annular recess includes a vertical leg, a first angled leg extending from the vertical leg, a horizontal leg extending from the first angled leg, a second angled leg extending from the horizontal leg and a third angled leg extending from the second angled leg to the first threaded inlet of the coupling member. The first angled leg and the horizontal leg define the beveled portion of the non-threaded portion of the coupling member and the second angled leg and the third angled leg define an undercut recess. The undercut recess is configured to receive the non-threaded portion at the free end of the first pipe.

The cross-section defining the annular recess may further include an additional horizontal leg extending from the vertical leg to a center of the non-threaded portion, a sloping leg extending from the additional horizontal leg, a fourth angled leg extending from the sloping leg and a fifth angled leg extending from the fourth angled leg to the second threaded inlet of the coupling member. The fourth angled leg and the fifth angled leg may be configured to define an additional undercut recess. The additional undercut recess may be configured to receive the non-threaded portion at the free end of the second pipe. The sloping leg may extend from the fourth angled leg to the additional horizontal leg at an angle of about 5°.

The beveled portions of the corrosion barrier ring, the second end of the ring member and the non-threaded portion of the coupling member may be beveled at about a 45° angle. The corrosion barrier ring is may be made of a resilient elastomeric material or any other suitable material.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENT INVENTION

Figure 1:
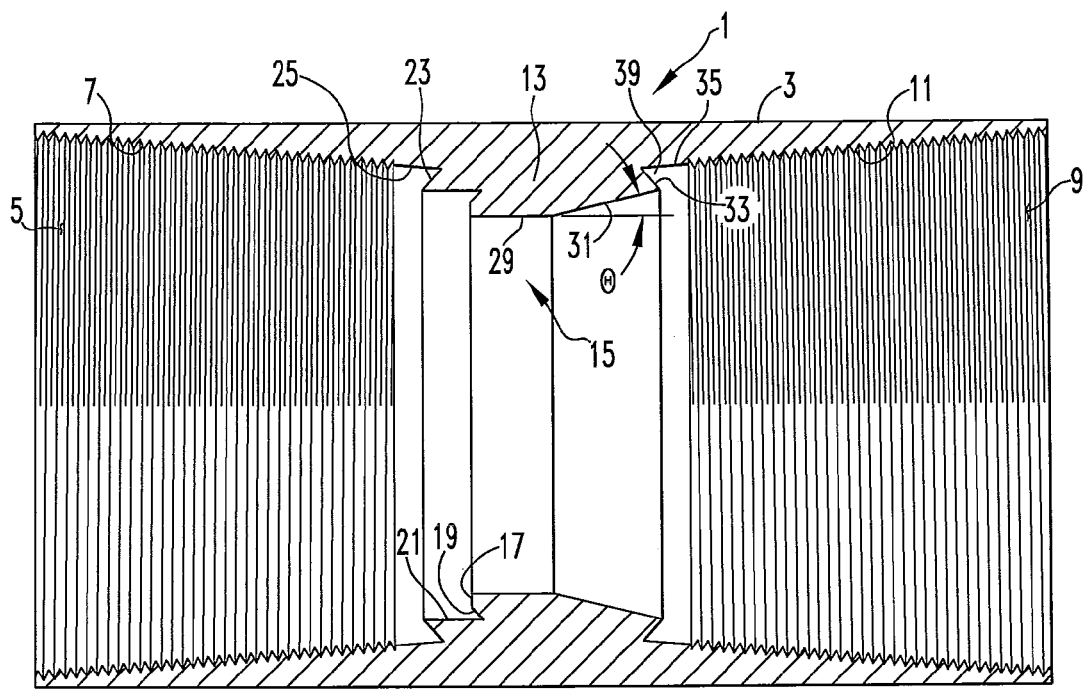
FIG. 1 is a cross-sectional view of a coupling member of a pipe coupling assembly for coupling a lined pipe with an unlined pipe in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

With reference to FIG. 1, a coupling member, denoted generally as reference numeral 1, comprises a generally cylindrical body 3 having a first inlet 5 with a threaded portion 7 and a second inlet 9 with a threaded portion 11. A non-threaded portion 13 extends between threaded portion 7 of the first inlet 5 and threaded portion 11 of second inlet 9. Coupling member 1 may be constructed from steel or any other suitable material.

Figure 2:
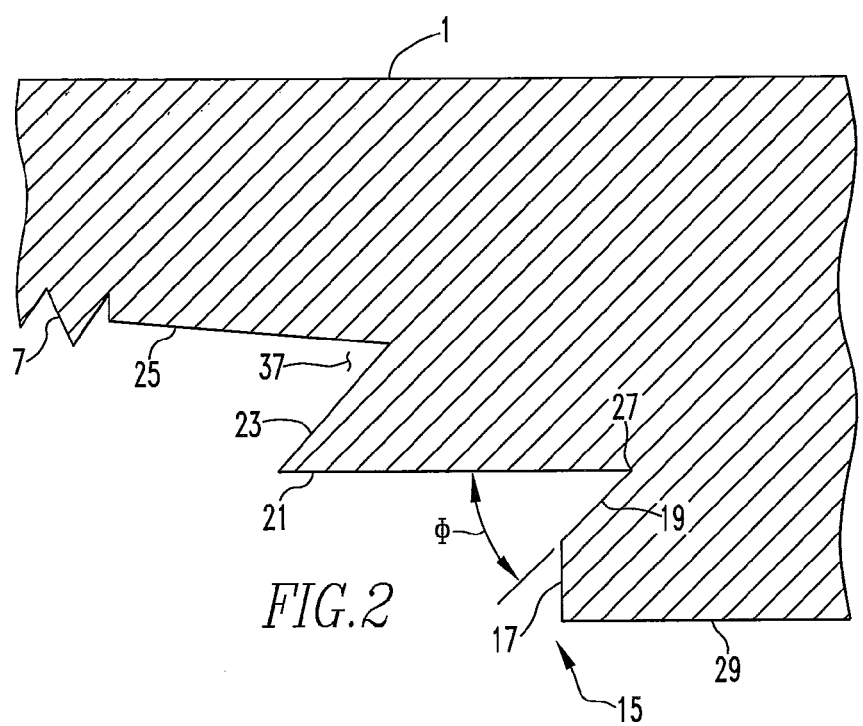
FIG. 2 is a portion of the cross-sectional view of FIG. 1 enlarged for magnification purposes.

With reference to FIG. 2 and with continuing reference to FIG. 1, non-threaded portion 13 of coupling member 1 includes an annular recess, denoted generally as reference numeral 15, configured to receive elements of a liner coupling assembly as will be discussed in greater detail hereinafter. A cross-section of coupling member 1 defining annular recess 15 includes a vertical leg 17, a first angled leg 19 extending from vertical leg 17, a horizontal leg 21 extending from first angled leg 19, a second angled leg 23 extending from horizontal leg 21 and a third angled leg 25 extending from second angled leg 23 to threaded portion 7 of first inlet 5 of coupling member 1.

The cross-section defining annular recess 15 further includes an additional horizontal leg 29 extending from vertical leg 17 to a center of non-threaded portion 13, a sloping leg 31 extending from additional horizontal leg 29, a fourth angled leg 33 extending from sloping leg 31 and a fifth angled leg 35 extending from fourth angled leg 33 to threaded portion 11 of second inlet 9 of coupling member 1. Sloping leg 31 extends from fourth angled leg 33 to additional horizontal leg 29 at an angle θ. The angle θ may be about 5°.

First angled leg 19 and horizontal leg 21 define a beveled portion 27 of non-threaded portion 13 of coupling member 1. Beveled portion 27 of non-threaded portion 13 of coupling member 1 may be beveled at an angle Φ. The angle Φ may be about 45°. Second angled leg 23 and third angled leg 25 are configured to define an undercut recess 37. Fourth angled leg 33 and fifth angled leg 35 are configured to define an additional undercut recess 39.

Figure 3:
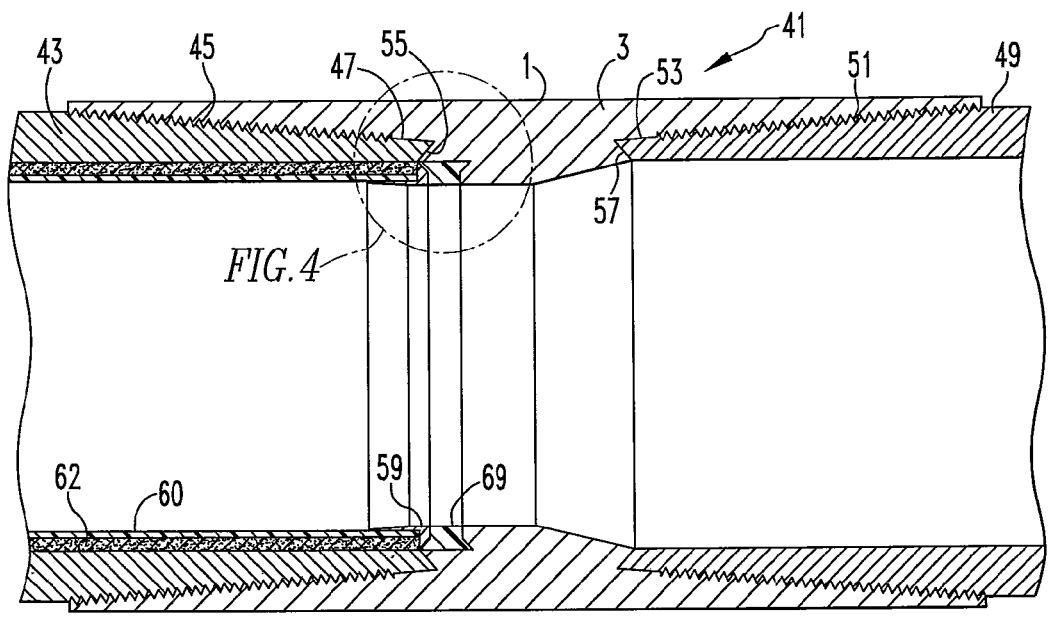
FIG. 3 is a cross-sectional view of a pipe coupling assembly with a lined pipe and an unlined pipe coupled thereto in accordance with the present invention.
Figure 4:
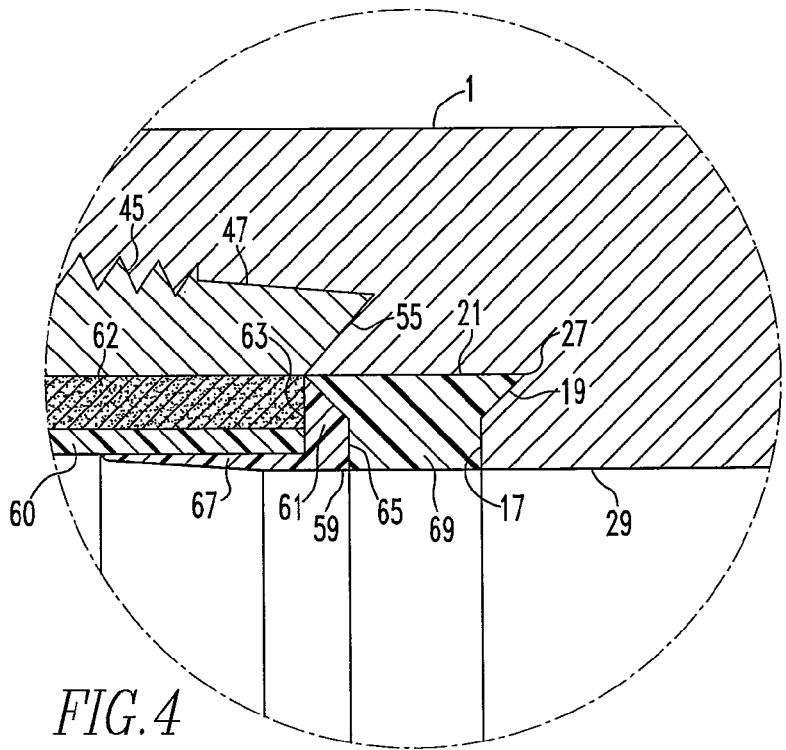
FIG. 4 is a portion of the cross-sectional view of FIG. 3 enlarged for magnification purposes.

With reference to FIGS. 3 and 4, and with continuing reference to FIGS. 1 and 2, a coupling assembly, denoted generally as reference numeral 41, includes a lined pipe 43 having a threaded portion 45 and a non-threaded portion 47 and an unlined pipe 49 having a threaded portion 51 and a non-threaded portion 53. Non-threaded portion 47 of lined pipe 43 is located at a free end 55 of lined pipe 43 and non-threaded portion 53 of unlined pipe 49 is located at a free end 57 of unlined pipe 49.

In addition, coupling assembly 41 includes a liner coupling assembly that includes a ring member 59, a liner 60 and a corrosion barrier ring 69. Ring member 59 is positioned at free end 55 of lined pipe 43 and liner 60 is disposed within lined pipe 43. Liner 60 is placed in lined pipe 43 such that an annular gap is formed with the inside surface of lined pipe 43. This annular gap is typically filled with mortar or grout 62 as is known in the art. Ring member 59 includes a body member 61 having a first end 63 and a second end 65. First end 63 of body member 61 has a flange 67 extending therefrom. Liner 60 has an end configured to cooperate with first end 63 of ring member 59. Ring member 59 may be made of glass-reinforced epoxy or any other suitable material.

Figure 5:
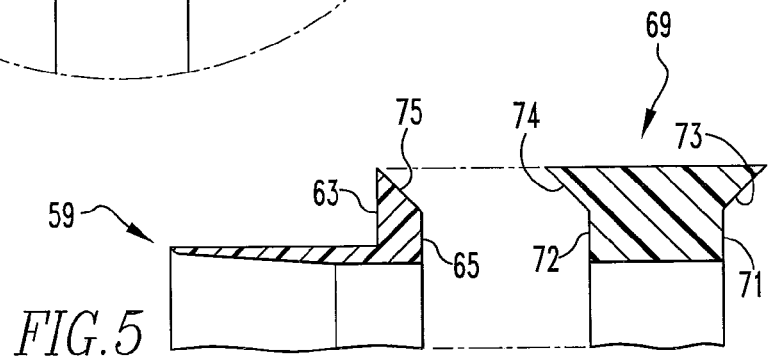
FIG. 5 is an exploded, cross-sectional view of a portion of the pipe coupling assembly of FIG. 3 enlarged for magnification purposes.

With reference to FIG. 5, and with continuing reference to FIGS. 3 and 4, the liner coupling assembly of coupling assembly 41 also includes a corrosion barrier ring 69 disposed between and cooperating with second end 65 of ring member 59 and beveled portion 27 of non-threaded portion 13 of coupling member 1. Corrosion barrier ring 69 has opposing indented ends 71, 72 comprised of beveled portions 73, 74 configured to cooperate with a beveled portion 75 of second end 65 of ring member 59 and beveled portion 27 of non-threaded portion 13 of coupling member 1. Beveled portions 73, 74 and 75 of corrosion barrier ring 69 and second end 65 of ring member 59 may be beveled at about a 45° angle. Corrosion barrier ring 69 may be made of a resilient elastomeric material or any other suitable material.

Lined pipe 43 is configured to be received within first inlet 5 of coupling member 1, and unlined pipe 49 is configured to be received within second inlet 9 of coupling member 1. More specifically, undercut recess 37 is configured to receive non-threaded portion 47 at free end 55 of lined pipe 43, and additional undercut recess 39 is configured to receive non-threaded portion 53 at free end 57 of unlined pipe 49 thereby joining lined pipe 43 with unlined pipe 49. Corrosion barrier ring 69 is compressed between ring member 59 and beveled portion 27 of non-threaded portion 13 of coupling member 1. The compressed corrosion barrier ring 69 acts to prevent fluids passing through the joined pipe from causing coupling member 1 to fail due to internal corrosion. Accordingly, coupling assembly 41 provides a smooth transition between lined pipe 43 and unlined pipe 49.

Figure 6:
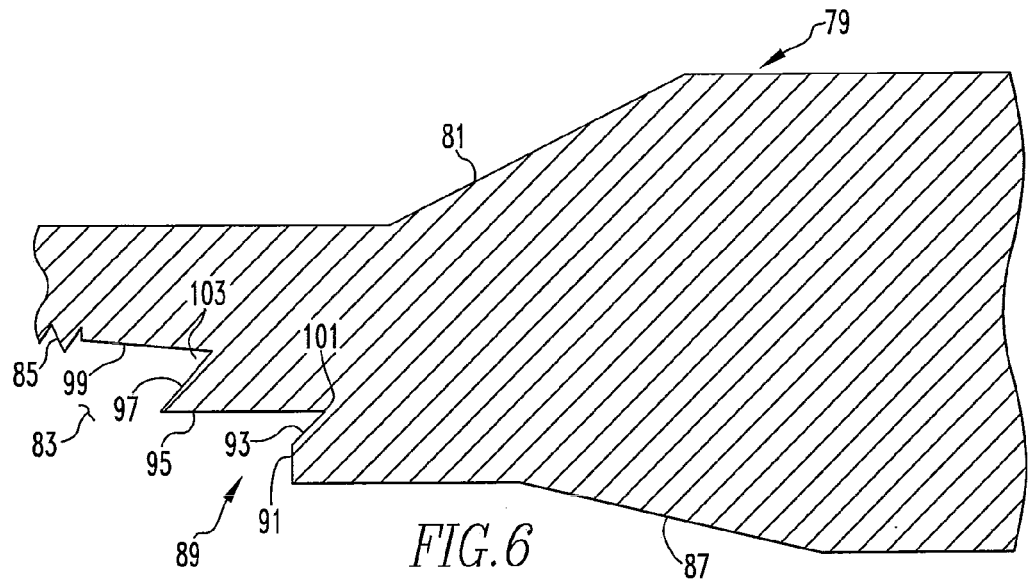
FIG. 6 is a cross-sectional view of a coupling member of a box accessory for coupling a lined pipe to the box accessory in accordance with the present invention.
Figure 7:
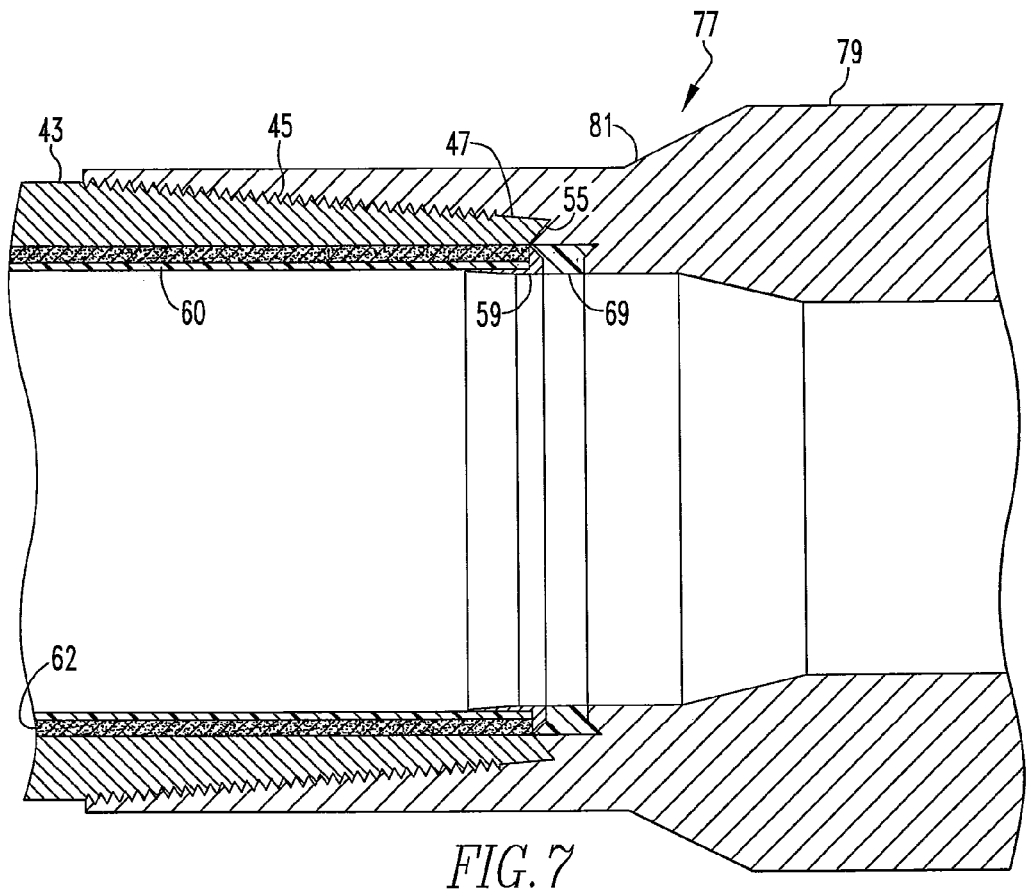
FIG. 7 is a cross-sectional view of a pipe coupling assembly with a lined pipe coupled to a box accessory in accordance with the present invention.

With reference to FIGS. 6 and 7, a coupling assembly in accordance with an additional embodiment of the present invention, denoted generally as reference numeral 77, includes a lined pipe 43 having a threaded portion 45 and a non-threaded portion 47, and a box accessory 79 comprising a coupling member 81 for fixedly connecting lined pipe 43 to box accessory 79. Non-threaded portion 47 of lined pipe 43 is located at a free end 55 of lined pipe 43. Box accessory 79 may be a valve or a pump.

Coupling member 81 includes an inlet 83 with a threaded portion 85 for receiving lined pipe 43 and a non-threaded portion 87 extending from threaded portion 85 of inlet 83. Non-threaded portion 87 of coupling member 81 includes an annular recess, denoted generally as reference numeral 89, configured to receive elements of a liner coupling assembly as will be discussed in greater detail hereinafter. A cross-section of coupling member 81 defining annular recess 89 includes a vertical leg 91, a first angled leg 93 extending from vertical leg 91, a horizontal leg 95 extending from first angled leg 93, a second angled leg 97 extending from horizontal leg 95 and a third angled leg 99 extending from second angled leg 97 to threaded portion 85 of inlet 83 of coupling member 81. First angled leg 93 and horizontal leg 95 define a beveled portion 101 of non-threaded portion 87 of coupling member 81. Beveled portion 101 of non-threaded portion 87 of coupling member 81 may be beveled at an angle of about 45°. Second angled leg 97 and third angled leg 99 are configured to define an undercut recess 103.

With returning reference to FIG. 5, and with continuing reference to FIGS. 6 and 7, coupling assembly 77 includes a liner coupling assembly that includes a ring member 59, a liner 60 and a corrosion barrier ring 69. Ring member 59 is positioned at free end 55 of lined pipe 43 and a liner 60 is disposed within lined pipe 43. Liner 60 is placed in lined pipe 43 such that an annular gap is formed with the inside surface of lined pipe 43. This annular gap is typically filled with mortar or grout 62 as is known in the art. Ring member 59 includes a body member 61 having a first end 63 and a second end 65. First end 63 of body member 61 has a flange 67 extending therefrom. Liner 60 has an end configured to cooperate with first end 63 of ring member 59. Ring member 59 may be made of glass-reinforced epoxy or any other suitable material.

The liner coupling assembly of coupling assembly 41 also includes a corrosion barrier ring 69 disposed between and cooperating with second end 65 of ring member 59 and beveled portion 101 of non-threaded portion 87 of coupling member 81 of box accessory 79. Corrosion barrier ring 69 has opposing indented ends 71, 72 comprised of beveled portions 73, 74 configured to cooperate with a beveled portion 75 of second end 65 of ring member 59 and beveled portion 101 of non-threaded portion 87 of coupling member 81 of box accessory 79. Beveled portions 73, 74 and 75 of corrosion barrier ring 69 and second end 65 of ring member 59 may be beveled at about a 45° angle. Corrosion barrier ring 69 may be made of a resilient elastomeric material or any other suitable material.

Lined pipe 43 is configured to be received within inlet 83 of coupling member 81 of box accessory 79. More specifically, undercut recess 103 is configured to receive non-threaded portion 47 at free end 55 of lined pipe 43 thereby joining lined pipe 43 with box accessory 79. Corrosion barrier ring 69 is compressed between ring member 59 and beveled portion 101 of non-threaded portion 87 of coupling member 81 of box accessory 79. The compressed corrosion barrier ring 69 acts to prevent fluids passing through lined pipe 43 to box accessory 79 from causing coupling member 81 to fail due to internal corrosion. Accordingly, coupling assembly 77 provides a smooth transition between lined pipe 43 and an unlined box accessory 79.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A coupling assembly comprising:
a first pipe comprising a threaded portion and a non-threaded portion, the non-threaded portion located at a free end of the first pipe;
a second pipe comprising a threaded portion and a non-threaded portion, the non-threaded portion located at a free end of the second pipe;
a coupling member fixedly connecting the first pipe and the second pipe, the coupling member comprising a first threaded inlet for receiving the first pipe, a second threaded inlet for receiving the second pipe and a non-threaded portion extending between the first inlet and the second inlet, the non-threaded portion of the coupling member including an annular recess, a cross-section of the coupling member defining the annular recess comprising:
a vertical leg;
a first angled leg extending from the vertical leg;
a horizontal leg extending from the first angled leg;
a second angled leg extending from the horizontal leg; and
a third angled leg extending from the second angled leg to the first threaded inlet of the coupling member, the first angled leg and the horizontal leg defining a beveled portion of the non-threaded portion of the coupling member and the second angled leg and the third angled leg defining an undercut recess, the undercut recess configured to receive the non-threaded portion at the free end of the first pipe, and
a lining system comprising:

a ring member positioned at the free end of the first pipe, the ring member comprising a body member having a first end and a second end, the first end having a flange extending therefrom;
a liner disposed in the first pipe, the liner having an end configured to cooperate with the first end of the ring member; and
a corrosion barrier ring disposed between and cooperating with the second end of the ring member and the beveled portion of the non-threaded portion of the coupling member, the corrosion barrier ring comprising opposing indented ends comprised of beveled portions configured to cooperate with a beveled portion of the second end of the ring member and the beveled portion of the non-threaded portion of the coupling member.

2. The coupling assembly of claim 1, wherein the cross-section defining the annular recess further comprises:
an additional horizontal leg extending from the vertical leg to a center of the non-threaded portion;
a sloping leg extending from the additional horizontal leg;
a fourth angled leg extending from the sloping leg; and
a fifth angled leg extending from the fourth angled leg to the second threaded inlet of the coupling member.

3. The coupling assembly of claim 2, wherein the fourth angled leg and the fifth angled leg define an additional undercut recess.

4. The coupling assembly of claim 3, wherein the additional undercut recess is configured to receive the non-threaded portion at the free end of the second pipe.

5. The coupling assembly of claim 2, wherein the sloping leg extends from the fourth angled leg to the additional horizontal leg at an angle of about 5°.

6. The coupling assembly of claim 1, wherein the beveled portions of the corrosion barrier ring, the second end of the ring member and the non-threaded portion of the coupling member are beveled at about a 45° angle.

7. The coupling assembly of claim 1, wherein the corrosion barrier ring is made of a resilient elastomeric material.

8. A coupling assembly comprising:
a pipe comprising a threaded portion and a non-threaded portion, the non-threaded portion located at a free end of the pipe;
a box accessory comprising a coupling member for fixedly connecting the pipe to the box accessory, the coupling member comprising a threaded inlet for receiving the pipe and a non-threaded portion extending from the threaded inlet, the non-threaded portion of the coupling member including an annular recess, a cross-section of the coupling member defining the annular recess comprising:
a vertical leg;
a first angled leg extending from the vertical leg;
a horizontal leg extending from the first angled leg;
a second angled leg extending from the horizontal leg;
and a third angled leg extending from the second angled leg to the threaded inlet of the coupling member, the first angled leg and the horizontal leg defining a beveled portion of the non-threaded portion of the coupling member and the second angled leg and the third angled leg defining an undercut recess, the undercut recess configured to receive the non-threaded portion at the free end of the first pipe, and
a lining system comprising:
a ring member positioned at the free end of the pipe, the ring member comprising a body member having a first end and a second end, the first end having a flange extending therefrom;

a liner disposed in the pipe, the liner having an end configured to cooperate with the first end of the ring member; and a corrosion barrier ring disposed between and cooperating with the second end of the ring member and the beveled portion of the non-threaded portion of the coupling member, the corrosion barrier ring comprising opposing indented ends comprised of beveled portions configured to cooperate with a beveled portion of the second end of the ring member and the beveled portion of the non-threaded portion of the coupling member.

9. The coupling assembly of claim 8, wherein the box accessory is one of a valve and a pump.

10. The coupling assembly of claim 8, wherein the beveled portions of the corrosion barrier ring, the second end of the ring member and the non-threaded portion of the coupling member are beveled at about a 45° angle.

11. The coupling assembly of claim 8, wherein the coupling member is made of steel.

12. The coupling assembly of claim 8, wherein the ring member is made of glass-reinforced epoxy.

13. The coupling assembly of claim 8, wherein the corrosion barrier ring is made of a resilient elastomeric material.

* * * * *